United States Patent [19]

Middleton

[11] Patent Number: 5,108,177
[45] Date of Patent: Apr. 28, 1992

[54] TWO-AXIS LEVELLING INSTRUMENT WITH A SINGLE PENDULUM FOR PROJECTING A LEVEL LASER BEAM

[75] Inventor: Michael A. Middleton, Cupertino, Calif.

[73] Assignee: Laserline, Inc., Mountain View, Calif.

[21] Appl. No.: 581,237

[22] Filed: Sep. 12, 1990

[51] Int. Cl.⁵ .................................. G01C 9/12
[52] U.S. Cl. ..................... 356/250; 356/138; 33/291
[58] Field of Search ............. 356/248, 250, 138, 141, 356/147; 33/281, 283, 290, 291, 295, DIG. 21

[56] References Cited

U.S. PATENT DOCUMENTS

| | | |
|---|---|---|
| 2,679,181 | 5/1954 | Keuffel et al. . |
| 2,821,104 | 1/1958 | Mills . |
| 3,588,249 | 6/1971 | Studebaker . |
| 3,588,255 | 6/1971 | Alexander . |
| 3,597,090 | 8/1971 | Humphrey . |
| 3,603,688 | 9/1971 | Smith-Vaniz . |
| 3,619,069 | 11/1971 | Alexander . |
| 3,635,565 | 1/1972 | Colson . |
| 3,734,627 | 5/1973 | Edwards . |
| 3,772,798 | 11/1973 | Kijima . |
| 3,793,735 | 2/1974 | Humphrey . |
| 3,822,943 | 7/1974 | Mason .................. 356/138 |
| 3,856,409 | 12/1974 | Cindrich et al. .......... 356/250 |
| 3,858,984 | 1/1975 | Denton et al. . |
| 3,874,088 | 4/1975 | Shaffer, Jr. . |
| 3,876,309 | 4/1975 | Zicaro et al. .......... 356/138 |
| 3,897,637 | 8/1975 | Genho . |
| 3,936,197 | 2/1976 | Aldrink et al. . |
| 3,982,839 | 9/1976 | Schwartz . |
| 4,031,629 | 6/1977 | Paluck . |
| 4,035,084 | 7/1977 | Ramsay . |
| 4,053,239 | 10/1977 | Tolmon . |
| 4,062,634 | 12/1977 | Rando et al. . |
| 4,082,466 | 4/1978 | Underberg . |
| 4,111,564 | 9/1978 | Trice, Jr. . |
| 4,136,962 | 1/1979 | Brouwer et al. ........... 356/248 |
| 4,221,483 | 9/1980 | Rando . |
| 4,333,242 | 6/1982 | Genho, Sr. . |
| 4,448,528 | 5/1984 | McManus . |
| 4,519,705 | 5/1985 | Morrow . |
| 4,621,433 | 11/1986 | Takeuchi et al. . |
| 4,674,870 | 6/1987 | Cain et al. . |
| 4,679,937 | 7/1987 | Cain et al. . |
| 4,732,471 | 3/1988 | Cain et al. . |
| 4,751,782 | 6/1988 | Ammann . |
| 4,752,539 | 6/1988 | Vatter . |
| 4,756,617 | 7/1988 | Cain et al. . |
| 4,767,208 | 8/1988 | Cain et al. . |
| 4,770,480 | 9/1988 | Teach . |
| 4,776,672 | 9/1988 | Rando et al. . |
| 4,781,457 | 11/1988 | Hirano et al. . |
| 4,801,791 | 1/1989 | Cain ..................... 250/201.1 |
| 4,836,669 | 6/1989 | Teach . |
| 4,854,704 | 8/1989 | Funazaki et al. . |
| 4,902,130 | 2/1990 | Bouillot et al. ............ 356/248 |
| 4,912,851 | 4/1990 | Rando et al. ............ 33/DIG. 21 |
| 4,988,192 | 1/1991 | Knittel .................. 33/DIG. 21 |

*Primary Examiner*—Samuel A. Turner
*Attorney, Agent, or Firm*—Townsend & Townsend

[57] ABSTRACT

A simple structure for providing a level laser beam. A pendulum is suspended by at least two suspension supports along the line parallel to a path of a laser beam emitted from a laser. An optical element is mounted on the pendulum to intercept the laser beam and reflect it along a path orthogonal to the first path. The pendulum will maintain the optical element in a vertical alignment, and accordingly the beam reflected off the optical element will be horizontal.

14 Claims, 5 Drawing Sheets

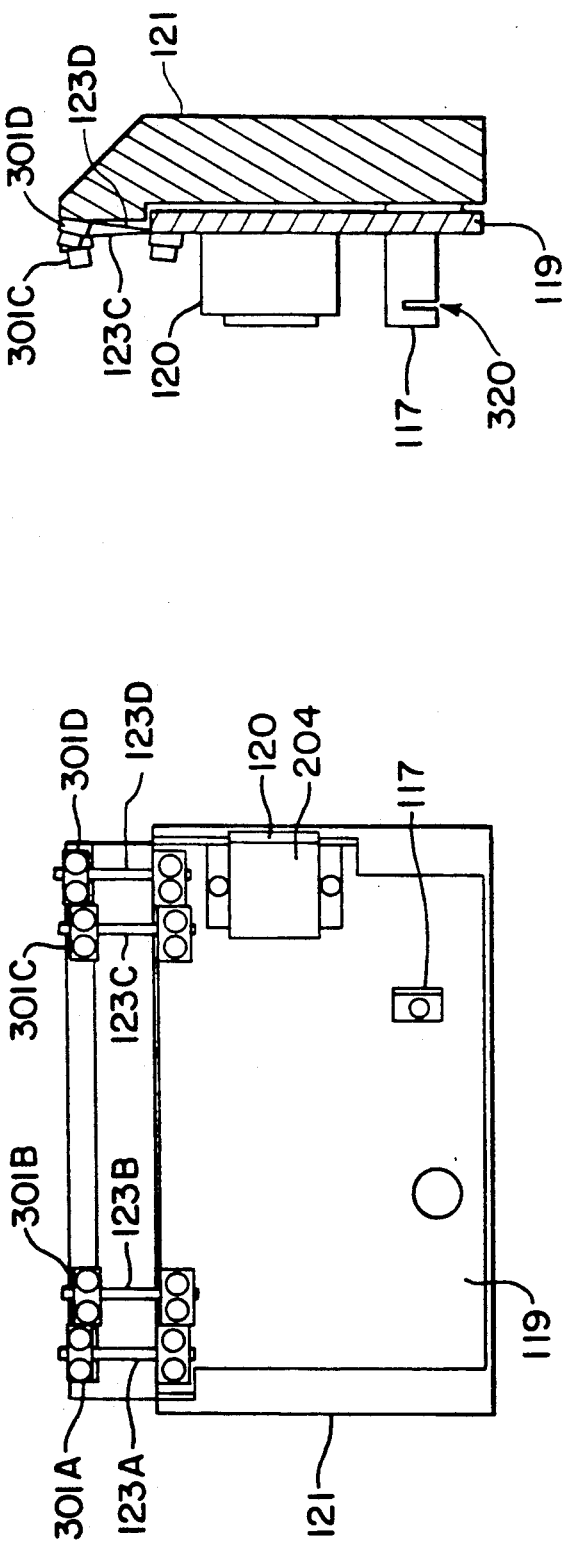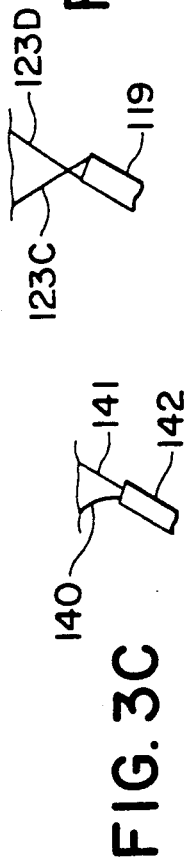

TWO-AXIS LEVELLING INSTRUMENT WITH A SINGLE PENDULUM FOR PROJECTING A LEVEL LASER BEAM

BACKGROUND

The present invention relates to a laser alignment devices for projecting a level laser beam, for sweeping a laser beam in a vertical plane, and for producing laser beams at right angles to each other.

In many applications, such as construction, there is a need to establish a level line in order to construct something which is level or varies by a measurable amount from a level line. In addition, for the construction of walls and other vertical structures, it is desirable to align the wall to be completely vertical. Where a corner of the building is being constructed, it is desirable to have the corner at an exact right angle so that once the square of the building is completed, the sides will match up.

One method of producing a level line with a laser beam is to mount a laser in an instrument so that the laser beam is directed downward to a pendulum-supported 90° reflector which then sends out a horizontal laser beam. The reflector can also be rotatable, so that a scanning beam in a horizontal plane is generated. Such a system is shown in U.S. Pat. Nos. 4,221,483 and 4,679,937. One such rotating optical structure is referred to as a penta-prism. U.S. Pat. No. 4,062,634 shows a device which produces a scanning beam in a horizontal plane and can be turned on its side to produce a scanning beam in a vertical plane.

Some devices produce laser beams which are at 90° with respect to each other for use in aligning corners of buildings, etc. One such system is shown in U.S. Pat. No. 4,836,669. Orthogonal fans of light are produced by using a cone-shaped reflector to deflect light in two directions. U.S. Pat. No. 3,897,637 shows a laser level and square which uses mirrors and beam splitters to produce orthogonal laser beams at the same time.

SUMMARY OF THE INVENTION

The present invention provides a simple structure for providing a level laser beam. A pendulum is suspended by at least two suspension supports along the line parallel to a path of a laser beam emitted from a laser. An optical element is mounted on the pendulum to intercept the laser beam and reflect it along a path orthogonal to the first path. The pendulum will maintain the optical element in a vertical alignment, and accordingly the beam reflected off the optical element will be horizontal.

In one embodiment, a penta-prism intercepts the horizontal beam and creates a sweeping beam in a vertical plane. This allows precise vertical alignment of walls and similar structures.

The pendulum used in the present invention is preferably a long flat plate hung adjacent to a long flat surface on a support structure. The large area allows for air damping between the plate and the support structure, while the weight of the plate provides a stable pendulum. The pendulum is supported by two pairs of criss-crossed flat wire foils at either end. The use of two foils at each end keeps the top of the pendulum from rotating horizontally while the criss-crossing of the foils prevents mis-alignment of the pendulum as a result of the weight being primarily on one or the other of the wire foils when it tilts.

The optics of the present invention are mounted on a turntable which can be rotated by a motor to produce an output laser beam scanning plane which is 90° from the original beam output direction. A mechanical mechanism is provided to stop the turntable and spring load it at the desired position. Thus, a precise 90° angle can be measured for corners of buildings, etc., without the use of expensive additional optics which must be precisely aligned. The mechanism is mounted in a waterproof housing with two narrow windows allowing the beam to exit at the 90° angles. Each of the windows is cut from a single pane of glass, so that any refraction due to the windows will be nearly identical and not affect the 90° angle.

The present invention also provides a block for mounting the laser emitting device on a flat-head tripod. The block has a hemispherical top surface on which to move the apparatus in order to make it level with respect to gravity. The block itself can then be slid across the top of the flat-head tripod to move the center of the laser emitting apparatus back over the control point from which the measurement is being made.

For a fuller understanding of the nature and advantages of the invention, reference should be made to the ensuing detailed description taken in conjunction with the accompanying drawings.

BRIEF DESCRIPTION OF THE DRAWINGS

FIGS. 3A and 3B are front and side views, respectively, of the pendulum support structure in the apparatus of FIG. 1;

FIGS. 3C and 3D are diagrams illustrating the loading of the uncrossed and crossed wire foil supports for the pendulum of FIG. 3A;

DETAILED DESCRIPTION OF THE PREFERRED EMBODIMENTS

Figure 1:
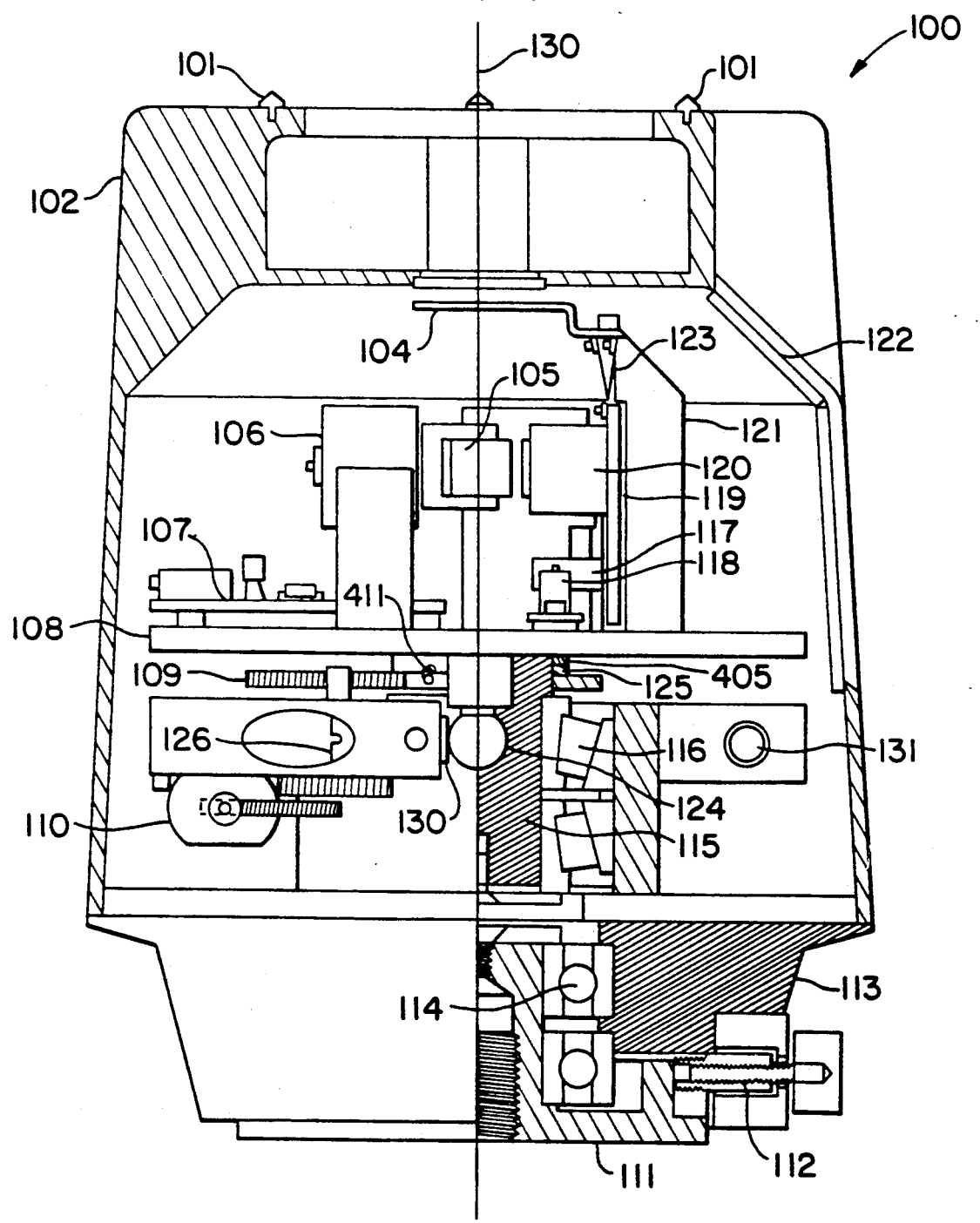
FIG. 1 is a side, cutaway view of the laser projecting apparatus according to the present invention.

FIG. 1 is a side, cutaway view of a laser level device 100 according to the present invention. A laser beam is reflected off a mirror on the other side of a mirror mount 120 to a rotating penta-prism 105. The penta-prism 105 projects the laser beam out of the page of FIG. 1 in a scanning plane indicated by line 130. A housing 102 has a window to allow the beam to exit. The output window extends vertically downward, and is not shown to give a cutaway view of the interior of device 100.

Figure 2:
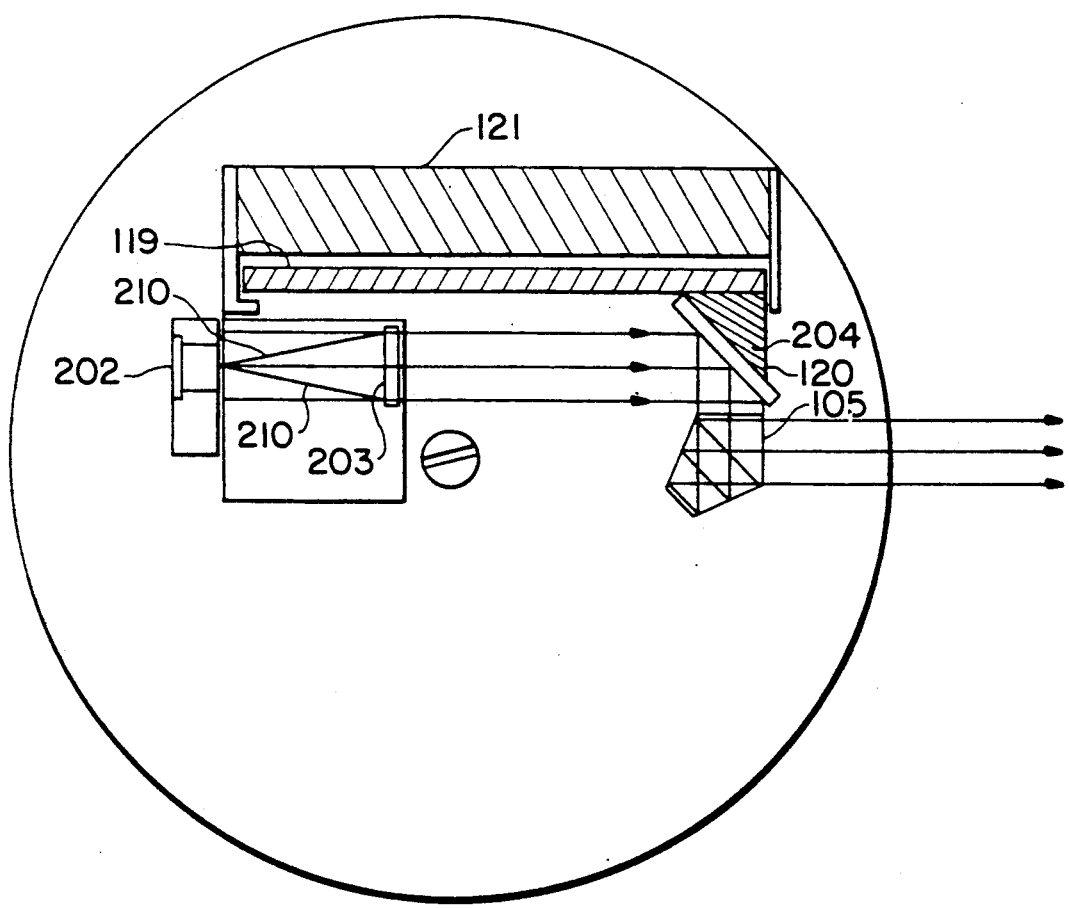
FIG. 2 is a diagram showing the laser beam path in the apparatus of FIG. 1.

FIG. 2 shows the laser beam path. A laser 202 emits a diverging laser beam 210 which is collimated by a collimating lens 203, and then reflected off a mirror 204 mounted on mirror mount 120. The reflected beam from mirror 204 is reflected again by penta-prism 105. Mirror support 120 is mounted on a pendulum 119 which hangs from a pendulum support 121.

Returning to FIG. 1, it can be seen that pendulum support 121 is mounted on a rotating platter 108. Platter 108 will rotate 90° so that the scanning laser beam can be projected out a window 122 on a side of housing 102 at an angle of 90° to the front window.

The pendulum 119 is shown in more detail in FIGS. 3A and 3B. As can be seen, mirror 204 is mounted with mirror mount 120 to pendulum 119. The pendulum is supported by flexible foils 123A, 123B, 123C and 123D from a support structure 121. A beam shutoff vane 117 is used to detect when the pendulum exceeds a maximum angle as discussed below.

As can be seen from FIGS. 2, 3A and 3B, the pendulum will only swing along one direction. If the apparatus is tilted from left to right or right to left in FIG. 2 or FIG. 3A, the laser beam will be directed downward or upward as it is emitted from laser 202, and will not be horizontal. However, upon hitting mirror 204, the laser beam will be reflected off at an angle of 90°. The reflected laser beam projects outward from a vertical plane of the pendulum. Because of this arrangement, the beam projecting outward will always be horizontal regardless of whether the beam hitting the mirror is horizontal or at an angle upward or downward. In any combination of tilting of the apparatus, the component of the tilt in the direction of right to left or left to right in FIG. 2 will not affect the horizontal beam projecting outward as long as the pendulum corrects for the component of the tilt in the up and down direction of FIG. 2 (or the in and out of the page direction of FIG. 3A). The second reflection of the beam with penta-prism 105 will generate a sweeping beam in a vertical plane since the beam that it receives is purely horizontal.

As can be seen in FIG. 3A, each side of pendulum 119 is supported by two wire foils (123A and 123B on one side and 123C and 123D on the other). These foils form an X as shown in FIG. 3B. For example, foil 123C is mounted via mount 301C in a position in front of mount 301D for foil 123D. The lower ends of the foils, coupled to pendulum 119, are in an opposite arrangement with foil 123C being behind foil 123D. The use of two foils on either end of pendulum 119 prevents the top of the pendulum from moving, and thus prevents the pendulum from rotating about an axis other than the top of the pendulum. The cross-over in the X pattern of the wire foils prevents the top of the pendulum from moving as it tilts one way or the other. This is illustrated in FIG. 3C which shows a pendulum 142 supported by two wires 140 and 141, with the pendulum tilting toward the left. As can be seen, wire 140 will bend with most of the weight being borne by wire 141. If instead, the arrangement of the present invention as shown in FIG. 3D is used, as pendulum 119 tilts to the left it attempts to transfer weight to wire foil 123D. However, the right side of the top of the pendulum tilts downward, keeping wire foil 123C taut, and also distributing some of the weight along this wire foil. Thus, not only will both wires remain taut, improving their lifetime and their resistance to shock supplied to the laser leveling apparatus, it will also make the pendulum hang at a correct vertical level, without it being pulled off slightly due to the effect of FIG. 3C or the mechanical stiffness of the foils. The crossover of the foils can be tailored to eliminate errors caused by the stiffness of the foils.

Returning to FIG. 1, beam shutoff vane 117 can be seen passing through a light source and receiver 118. As long as the pendulum is within an allowable range of tilt, the light beam from the source will be received by the receiver through a slot 320 (see FIG. 3B) in vane 117. In the preferred embodiment, the beam is shut off if the laser tilt exceeds 15 minutes of arc. When the vane moves enough to attenuate the light to the receiver, the laser is turned off. It is assumed that the operator can manually position a laser level apparatus 100 on a tripod or other device so that it is level within 15 minutes (¼ of a degree). The apparatus is placed to within a ¼ degree of level through the use of conventional adjusting screws and bubble vials not shown. Alternately, a two axis limit switch may be used, such as the one disclosed in my copending patent application Ser. No. 07/581,221, filed concurrently herewith, entitled "Two Axis Optical Tilt Switch" and hereby incorporated herein by reference.

Penta-prism 105 of FIG. 1 is rotated using a motor 106. The control electronics for the penta-prism motor, the laser, and the sensor are on a circuit board 107 mounted onto rotatable platter 108. Platter 108 is rotated using a spur gear 109. In the position shown, a tool ball 124 connected to the bottom of platter 108 is abutted against a stop 130 to stop movement at exactly 90°. Stop 130 has a far end 126 which allows it to be adjusted with a screwdriver. A similar stop 131 is provided for the other end of the 90° angle which will put the laser beam out through window 122. Platter 108 is loaded against either of the stops by the use of a spring 411 and two scissor plates 125 and 405, as will be discussed in more detail with respect to FIG. 4 below.

A bar 104, connected to support 121, provides a pointer to indicate the particular window through which the laser beam is being projected. This allows the operator to easily determine the alignment of the device. Rotatable platter 108 is rotated by spur gear 109 which moves an axle 115 which moves inside transition bearing 116. A transition motor 110 is used to drive spur gear 109 through a gearing arrangement.

The bottom portion of apparatus 100 includes a base bearing 114, a base rotor 113, a base ring 111 and a tangent lock screw 112. The top of apparatus 100 includes a pair of sighting cones 101.

Figure 4:
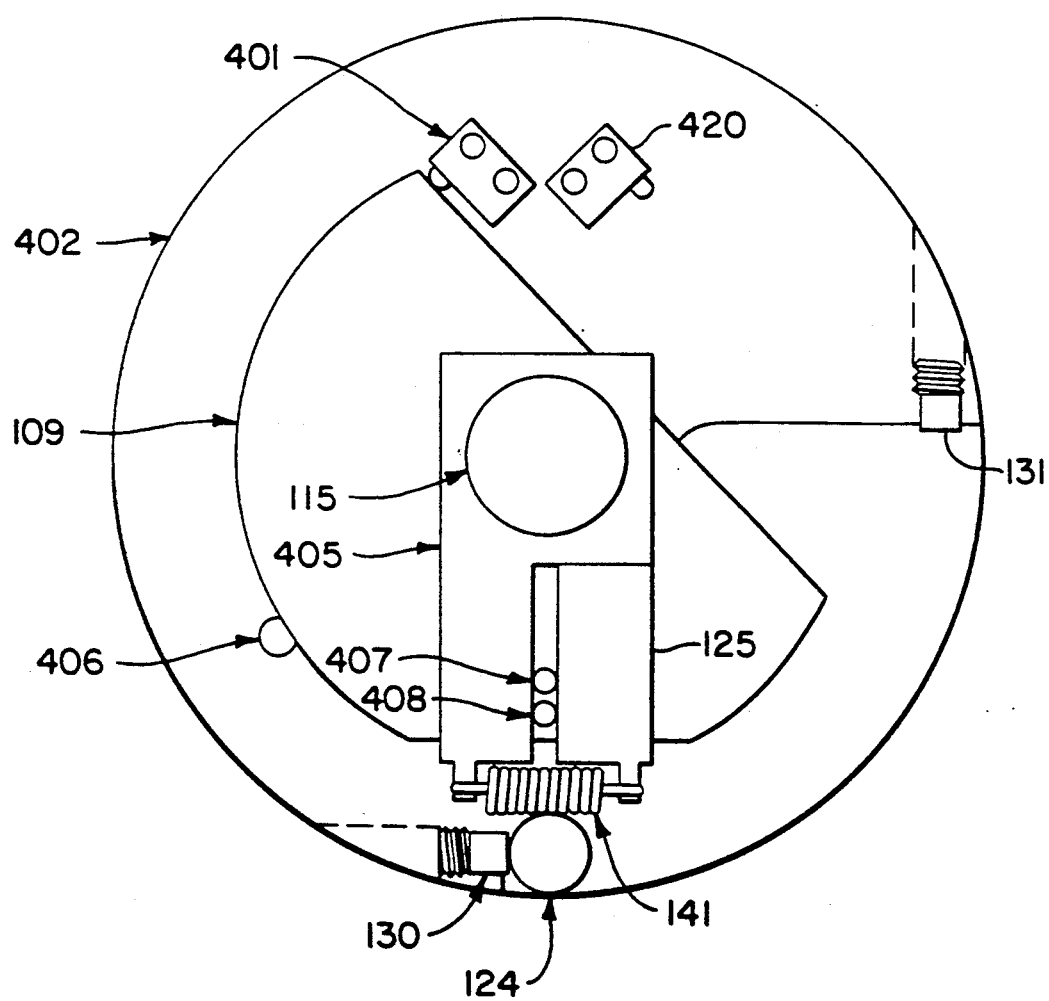
FIG. 4 is a diagram of the spring loading structure for the 90° rotation turntable of the apparatus of FIG. 1.

Turning to FIG. 4, a top view is shown of scissor plates 405 and 125. Tool ball 124 and transfer post 408 are coupled to rotatable platter 108 of FIG. 1 which is above the arrangement shown in FIG. 4. As gear 109 rotates to the left, tool ball 124 is stopped by stop 130. At the same time, since transfer post 408 is coupled to the rotatable platter (coupled to tool ball 124), scissor arm 125 is also stopped. However, scissor arm 405 continues to rotate to the left with spur gear 109 because it is pushed by a transfer post 407 connected to spur gear 109. This causes spring 411 to be stretched, thereby loading rotatable platter 108 to prevent it from vibrating or rotating. A limit switch 401 is hit by spur gear 109 shortly after tool ball 124 is stopped. This stops the motor 110 driving the spur gear at the desired loading level. Because motor 110 has a worm drive, it will not back up under the pressure of spring 411.

Similarly, in the opposite direction, spur gear 109 will rotate the apparatus to the right until tool ball 124 hits stop 131, at which time transfer post 408 will hold back scissor arm 405. Transfer post 407, connected to spur gear 109, will continue rotating, pushing scissor arm 125 and loading spring 411 until limit switch 420 is hit. Limit switch 420 also stops motor 110.

Also shown in FIG. 4 is the housing 402 and a drive pinion 406 for driving spur gear 109.

The line laser 100 is a machine intended to establish a straight line for guidance as well as a vertical plane which is self-plumbing for use in aligning any sort of vertical structure. This vertical plane is then rotated inside the unit to provide the user with a precise 90° angle for use in laying out right angle corners.

The operation of the unit is very simple. It requires only a stable platform to hold the laser and a receiver capable of detecting a rotating infrared laser beam. The unit is set up on a platform or a tripod. The receiver is then placed on a pre-determined point which establishes the known orientation of the side of the structure.

The laser is then rotated externally until the beam is directly striking the receiver. The laser will now produce a vertical plane corresponding to the wall of a structure. The receiver can detect the plane and provide guidance points for the builder anywhere in a direct viewing line from the laser up to the laser's maximum range. Once work or readings from this initial set up plane have been completed, a switch can be activated causing the laser to rotate internally and produce a vertical plane at a precise 90° from the original set up plane. This allows the builder to lay out the next part of the structure in reference to this plane with assurance that the structure is square (90°) and vertical. Using this technique, the builder can work his way around a structure and reference his work to what has already been laid out until he comes back to the initial side to close the loop for a final verification.

The pendulum relies on air damping and the spacing of the damper plates determines the amount of damping, and also protects the foils from damage due to front-/back shock loads.

The base assembly shown in FIG. 1 consists of a base ring 111, a slip ring (not visible), base rotor 113, two bearings 114, and tangent screw assembly 112 with spring load. The base ring attaches directly to the tripod or other stable mount and remains fixed during set up and operation of the laser. The base rotor 113 rides on two pre-loaded bearings 114 and carries the tangent block assembly 112. Between the base ring and base rotor is the slip ring with tangent post. This slip ring can either be locked on the base ring, or allowed to slide around the base ring to permit 360° rough aiming. When the slip ring is locked onto the base ring by pressure from the lock screw, the tangent screw can rotate the laser a small amount in either direction to achieve the final set up.

The housing section covers the beam section and the 90° section to assure weather shielding, and contains the batteries to drive the system. It provides a handle with an aiming system (cones 101) and has windows (103, 122) with an indicator (104) to show in which direction the reference plane is being projected. The windows cover two slots which allow the sweeping beam to pass through the wall of the housing, through a sweep of roughly 135° beginning at the vertical and sweeping downward to a 45° downward angle. The rest of the sweep is blocked by the housing and allows set up without the operator receiving laser sweeps across his eyes.

The housing contains a battery pack with replaceable cells (either rechargeable or dry cell), and the controls to operate and monitor the laser. The controls consist of left-right transition switch, on-off switch, battery condition indicator, off level indicator, and low battery light. The plane direction indicator is formed by a panel attached to the rotatable beam section with an indicator arrow visible through the window in the top of the housing. This indicator arrow rotates with the inner mechanism to show the direction of the beam.

Figure 5:
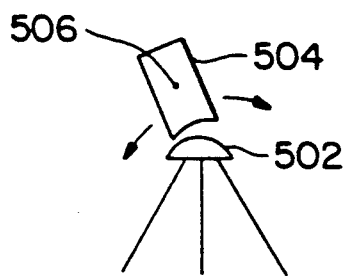
FIG. 5 is a diagram of a prior art dome tripod with a laser leveling apparatus.

FIG. 5 shows a prior art dome tripod 502 with a laser leveling apparatus 504 on top of it. In order to make the laser apparatus 504 level, such as where dome tripod 502 is on a slight incline, laser apparatus 504 is moved across the curved top of the dome tripod. When this is done, the center 506 may end up at a position other than directly over the center of the dome tripod, which was set up over the control point from which the measurement is desired to be made. Thus, some inaccuracy is caused or the tripod must be moved again after apparatus 504 is adjusted.

Figure 6:
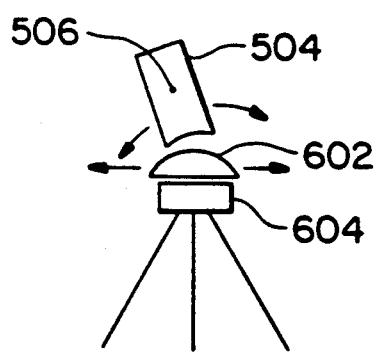
FIG. 6 is a diagram of the adjusting block of the present invention in use on a flat-head tripod.

FIG. 6 shows a block 602 according to the present invention mounted on a flat-head tripod 604. Laser projecting apparatus 504 can be moved over block 602 in the same manner as discussed for FIG. 5. Once apparatus 504 is leveled, block 602 can be moved across the top of flat-head tripod 604 until center point 506 is again over the control point. This is thus easily done without requiring the tripod to be moved and without requiring further adjustments to laser projecting apparatus 504.

As will be understood by those familiar with the art, the present invention may be embodied in other specific forms without departing from the spirit or essential characteristics thereof. For example, a suspension method other than the flexible foils could be used to support the pendulum of the present invention. Accordingly, the disclosure of the preferred embodiment of the invention is intended to be illustrative, but not limiting, of the scope of the invention which is set forth in the following claims.

What is claimed is:

1. An apparatus for producing a level laser beam comprising:
   a support structure;
   a laser mounted on said support structure to produce a roughly horizontal laser beam along a first path;
   a vertically suspended pendulum parallel to said first path suspended from a portion of said support structure by at least two suspension supports along a line parallel to said first path; and
   an optical element mounted on said pendulum at a position where said optical element intercepts said laser beam and reflects it along a second path orthogonal to said first path and precisely horizontal.

2. The apparatus of claim 1 further comprising:
   a second optical element mounted on said support structure to receive said laser beam along said second path and reflect said laser beam in a direction orthogonal to said second path; and
   means, mounted on said support structure, for rotating said second optical element such that said laser beam sweeps through a vertical plane.

3. The apparatus of claim 1 further comprising means for rotating said support structure by 90° to provide laser beams at a right angle to each other.

4. The apparatus of claim 1 wherein said pendulum comprises a flat, rectangular plate mounted adjacent a corresponding flat surface of said support structure such that movements of said pendulum are air dampened between said plate and said flat surface.

5. The apparatus of claim 1 wherein said suspension supports comprise two pairs of wires, each pair coupled to a separate end of said pendulum.

6. The apparatus of claim 5 wherein said wires have a flat, wider dimension along a direction pointing towards the other pair of wires.

7. An apparatus for producing a level laser beam comprising:

a support structure;

a laser mounted on said support structure to produce a roughly horizontal laser beam along a first path;

a pendulum suspended parallel to said first path from a portion of said support structure by two pairs of wires along a line parallel to said first path, each pair coupled to a separate end of said pendulum, wherein each of said pair of wires form an X such that a first wire is coupled to said support structure behind said second wire but coupled to said pendulum ahead of said second wire; and an optical element mounted on said pendulum at a position where said optical element intercepts said laser beam and reflects it along a second path orthogonal to said first path and precisely horizontal.

8. The apparatus of claim 3 further comprising a housing for enclosing said apparatus, said housing having two elongate windows at 90° angles, said windows being cut from the same pane of glass.

9. An apparatus for producing a level laser beam comprising:

a support structure;

a laser mounted on said support structure to produce a roughly horizontal laser beam along a first path;

a pendulum suspended parallel to said first path from a portion of said support structure by at least two suspension supports along a line parallel to said first path;

an optical element mounted on said pendulum at a position where said optical element intercepts said laser beam and reflects it along a second path orthogonal to said first path and precisely horizontal;

means for rotating said support structure by 90° to provide laser beams at a right angle to each other; and means for spring-loading said support structure in first and second positions at 90° from each other.

10. The apparatus of claim 9 wherein said means for spring-loading comprises:

first and second scissor plates coupled to an axle for said support structure;

a spring coupling together at the ends of said first and second scissor plates;

first and second stops mounted at 90° from each other;

a projection from said structure for contacting said stops at first and second 90° separated positions;

means for rotating said support structure;

a first transfer post extending upward from said means for rotating between said scissor plates; and a second transfer post extending downward from said support structure between said scissor plates.

11. The apparatus of claim 10 further comprising first and second limit switches positioned to be contacted by said means for rotating at an arcuate position beyond said first and second stops, said limit switches being coupled to the motor for said means for rotating to stop said motor upon being contacted, said motor including a worm drive such that said spring will not retract the position of said motor.

12. An apparatus for producing a level laser beam comprising:

a support structure;

a laser mounted on said support structure to produce a roughly horizontal laser beam along a first path;

a pendulum suspended parallel to said first path from a portion of said support structure by at least two suspension supports along a line parallel to said first path;

an optical element mounted on said pendulum at a position where said optical element intercepts said laser beam and reflects it along a second path orthogonal to said first path and precisely horizontal;

a vane coupled to said pendulum, said vane having an opening;

a photo-emitter mounted on one side of said vane; and a photodetector mounted on another side of said vane, such that said photodetector will detect light through said opening when said pendulum is hanging within a predetermined range of angles.

13. An apparatus for projecting a laser beam comprising:

a support structure;

a laser mounted on said support structure;

optical means, mounted on said support structure, for directing a laser beam from said laser in a first direction;

first and second scissor plates coupled to an axle for said support structure;

a spring coupling together at the ends of said first and second scissor plates;

first and second stops mounted at 90° from each other;

a projection from said structure for contacting said stops at first and second 90° separated positions;

means for rotating said support structure;

a first transfer post extending upward from said means for rotating between said scissor plates; and a second transfer post extending downward from said support structure between said scissor plates.

14. An apparatus for projecting a vertically scanned laser beam from on top of a flat-head tripod comprising:

a laser;

optical means for directing a vertically scanned laser beam from said laser in a first direction;

a support structure for supporting said laser and said optical means, said support structure having a concave bottom;

a block having a convex top surface matching the curvature of said concave bottom and having a larger area than said concave bottom, said block having a flat bottom, such that said support structure can be moved around on said top surface of said block until it is vertical and said block can be moved across said flat-head tripod to return said support structure to the center of said tripod.

* * * * *